W. SMITH.
SPRING-EQUALIZER.

No. 170,691.  Patented Dec. 7, 1875.

Attest:  
Jas. H. Layman,  
J. O'Hara Jr.

William Smith, Inventor.

N. PETERS, PHOTO-LITHOGRAPHER, WASHINGTON, D. C.

United States Patent Office.

WILLIAM SMITH, OF INDEPENDENCE, KENTUCKY.

IMPROVEMENT IN SPRING-EQUALIZERS.

Specification forming part of Letters Patent No. 170,691, dated December 7, 1875; application filed August 17, 1875.

*To all whom it may concern:*

Be it known that I, WILLIAM SMITH, of Independence, Kenton county, Kentucky, have invented certain new and useful Improvements in Braces for Spring-Vehicles, of which the following is a specification:

The object of my invention is to prevent the injurious strain that is continually brought to bear against the springs of a wheeled vehicle by the constant surging back and forth of the body or bed of the carriage or wagon, and I accomplish this result in the following manner:

I interpose between the bed of the vehicle and the perch or reach of the running-gear two rods or links of unequal length, whose rear ends are united together with a knuckle-joint. The forward ends of the long and short rods are attached, respectively, to the body and perch, these bearings being so located with reference to each other as to cause the shortest link to assume a horizontal or nearly horizontal position.

By this arrangement said short link acts as a stay or tie to sustain all the longitudinal thrust of the body or bed of the vehicle, and, consequently, no injurious strain of this nature can be brought to bear against the springs which support the bed.

Figure 1:
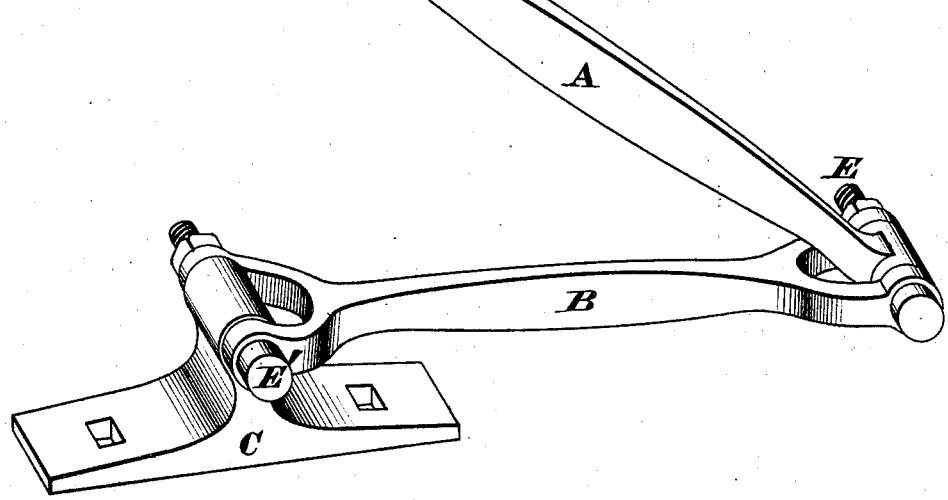
Figure 2:
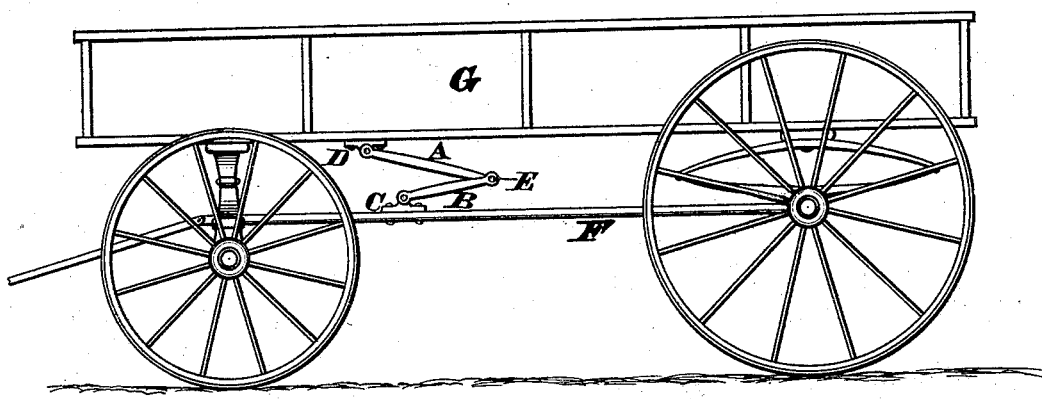

In the accompanying drawing, forming part of this specification, Figure 1 is a perspective view of my improved form of brace detached from the vehicle, and Fig. 2 shows it in position upon a spring-wagon.

A and B represent, respectively, two rods, arms, or links of unequal length, and having their rear ends united by an ordinary knuckle-joint, E. C and D represent two bearings, to which the links B and A are, respectively, pivoted by the bolts E' and E''.

In attaching these bearings to the vehicle the one, C, is secured to the reach or perch F, while the other bearing is bolted to the under side of the body G, as represented in Fig. 2. The bearing C is located somewhat to the rear of the one D, so as to cause the shortest link B to approximate a horizontal position.

In constructing these unequal links the short one, B, should be about long enough to reach from the perch F to the body G when the bed is in its normal position. The long rod A should be about one-fourth longer than the one B, and the height of bearing C should be equal to the difference between the length of the two members A and B.

When these two links are thus constructed and applied, it will be seen, at a glance, that the lower member B receives all the longitudinal surgings of the body G.

In case this body should, from any obstruction in the road, have a tendency to surge forward, such tendency is instantly arrested by the link B, which receives all of the strain, and transfers it to the bearing C, and thus relieves the springs. Any rearward surge of the body is compensated for in a precisely similar manner, the link B, in this case, however, acting to draw upon the bearing C, instead of pushing against it, as previously explained.

I am aware that it is not new to brace spring-vehicles by means of two links pivoted to each other, and then coupled to the bed and reach; but these links have heretofore been made of an equal length, and so disposed as to form an obtuse angle between them. Obviously, braces arranged in this manner can act only to limit the vertical vibrations or oscillations of the bed, while they will be altogether useless as a means of arresting the longitudinal surgings of the bed, which is the great advantage peculiar to my arrangement of the differential links. It will also be noticed that my brace is complete in itself, and no extraneous springs, ties, or adjusting devices are to be employed in conjunction with it, while its simplicity of construction enables it to be manufactured and applied to a vehicle by an ordinary blacksmith or wagon-maker. As it is entirely free from adjusting devices, ties, &c., it can be manufactured at a nominal cost, and after being once fitted in its proper place there is no danger of it becoming deranged in any manner.

What I claim as new, and desire to secure by Letters Patent, is—

A brace for spring-vehicles, consisting of the two links A and B, of unequal length, and united together at E, said links being attached, respectively, to the body G and reach F by bearings D E'' and C E', which bearings are located, with reference to each other, substantially as herein described and illustrated.

WILLIAM SMITH.

Witnesses:
J. O'HARA, Jr.,
WM. GOEBEL, Jr.